(12) United States Patent
Sunahiro

(10) Patent No.: US 9,656,547 B2
(45) Date of Patent: May 23, 2017

(54) VEHICLE

(71) Applicant: YAMAHA HATSUDOKI KABUSHIKI KAISHA, Iwata-shi, Shizuoka (JP)

(72) Inventor: Kazuo Sunahiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/882,497

(22) Filed: Oct. 14, 2015

(65) Prior Publication Data

US 2016/0152137 A1 Jun. 2, 2016

(30) Foreign Application Priority Data

Nov. 28, 2014 (JP) ................... 2014-242312

(51) Int. Cl.
| | |
|---|---|
| B60K 20/06 | (2006.01) |
| B62D 5/00 | (2006.01) |
| B62D 1/187 | (2006.01) |
| B62D 5/04 | (2006.01) |
| F16H 63/18 | (2006.01) |
| F16H 59/02 | (2006.01) |

(52) U.S. Cl.
CPC ............. B60K 20/06 (2013.01); B62D 1/187 (2013.01); B62D 5/00 (2013.01); B62D 5/04 (2013.01); F16H 63/18 (2013.01); *F16H 2059/0247* (2013.01)

(58) Field of Classification Search
CPC .......... B60K 20/06; B62D 5/00; B62D 1/189; F16H 61/02; F16H 59/02
See application file for complete search history.

(56) References Cited

U.S. PATENT DOCUMENTS

| | | | | |
|---|---|---|---|---|
| 4,838,197 A | * | 6/1989 | Watson | F16H 63/42 116/28.1 |
| 4,955,251 A | * | 9/1990 | Reinert | F16H 63/42 116/28.1 |
| 4,993,279 A | * | 2/1991 | Doescher | B62D 1/183 280/775 |
| 5,014,642 A | * | 5/1991 | Owen | F16H 63/42 116/28.1 |
| 6,116,646 A | * | 9/2000 | Plas | B62D 1/184 280/775 |
| 6,257,081 B1 | | 7/2001 | Gagnon et al. | |
| 7,278,510 B1 | * | 10/2007 | Richards | B62D 1/046 180/336 |
| 8,666,601 B1 | * | 3/2014 | Van Wiemeersch | B62D 15/0285 318/264 |

(Continued)

*Primary Examiner* — Darlene P Condra

(74) *Attorney, Agent, or Firm* — Keating and Bennett, LLP

(57) ABSTRACT

A recreational off-highway vehicle includes a supporting frame pivotally connected to a body frame via pivot shafts, a shaft support fixed to the supporting frame and including a steering shaft, a steering wheel connected to the steering shaft and rotatable around the steering shaft with respect to the shaft support, a paddle shifter disposed on the supporting frame and operable to move toward the steering shaft, a transmission supported by the body frame, a shift actuator that shifts the transmission, and a controller that controls the shift actuator so as to shift speed-changing gears of the transmission when the paddle shifter is operated.

13 Claims, 10 Drawing Sheets

(56) References Cited

U.S. PATENT DOCUMENTS

| | | | |
|---|---|---|---|
| 2002/0066658 A1* | 6/2002 | Agetsuma | B60K 20/06 200/61.54 |
| 2007/0004549 A1* | 1/2007 | Chryssochoos | F16H 59/0204 475/149 |
| 2009/0218160 A1* | 9/2009 | Baluch | B60K 20/06 180/336 |
| 2009/0270223 A1* | 10/2009 | Cook | B60K 20/06 477/77 |
| 2010/0175499 A1* | 7/2010 | Thomas | B60R 21/2032 74/552 |
| 2012/0184406 A1* | 7/2012 | Felton | B60K 20/06 477/107 |
| 2013/0075190 A1* | 3/2013 | Toyoda | B62D 1/181 180/444 |
| 2013/0092468 A1 | 4/2013 | Nelson et al. | |
| 2013/0112034 A1* | 5/2013 | Sano | B60Q 1/1461 74/520 |
| 2013/0305871 A1* | 11/2013 | Ohara | B62D 1/187 74/493 |
| 2014/0214275 A1* | 7/2014 | Miller | B62D 5/04 701/41 |
| 2015/0059509 A1* | 3/2015 | Pohanka | B62D 1/04 74/473.3 |

\* cited by examiner

VEHICLE

This application claims priority to Patent Application No. 2014-242312 filed in Japan on Nov. 28, 2014, the entire contents of which are hereby incorporated by reference.

BACKGROUND OF THE INVENTION

1. Field of the Invention

The present invention relates to vehicles suitable for traveling over rough terrain.

2. Description of the Related Art

Vehicles suitable for traveling over rough terrain are conventionally known. Among such vehicles are an all-terrain vehicle (ATV) and a recreational off-highway vehicle (ROV) including traditional transmissions. Some of such vehicles are known to use semi-automatic control in which a shift switch is operated to drive an actuator, such as an electric motor, so as to shift gears of a transmission. A driver of such a vehicle does not have to operate a clutch, thus relieving the burden on the driver's operation. Because an ATV includes a steering bar, a shift switch may be provided close at hand when semi-automatic control is used, so that operations performed on the shift switch are facilitated. For example, U.S. Pat. No. 6,257,081 B1 discloses an ATV including a steering bar provided with a shift switch. Because the shift switch is disposed close at hand, a driver can operate the shift switch to shift gears of a transmission without having to release his or her hand from the steering bar.

Unlike an ATV, an ROV includes a steering wheel and thus cannot be provided with a shift switch disposed close at hand. A possible solution is to provide a shift switch on the front surface of the steering wheel, for example. However, a driver of such an ROV frequently has to operate the steering wheel during traveling, and thus finds it difficult to operate the shift switch that rotates together with the steering wheel. For example, US 2013/0092468 A1 discloses various shift operating elements with which an actuator, such as an electric motor, is driven so as to shift gears of a transmission, but unfortunately does not disclose any specific structure for each shift operating element.

SUMMARY OF THE INVENTION

Accordingly, preferred embodiments of the present invention provide a steering wheel-equipped vehicle that facilitates shifting of gears of a transmission.

A vehicle according to a preferred embodiment of the present invention includes a body frame, at least one pivot shaft, a supporting frame, a shaft support, a steering wheel, a paddle shifter, a transmission, a shift actuator, and a controller. The supporting frame is pivotally connected to the body frame via the pivot shaft. The shaft support is fixed to the supporting frame. The shaft support includes a steering shaft. The steering wheel is connected to the steering shaft. The steering wheel is rotatable around the steering shaft with respect to the shaft support. The paddle shifter is disposed on the supporting frame or the shaft support. The paddle shifter is operable to move toward the steering shaft. The transmission is supported by the body frame. The transmission includes a plurality of speed-changing gears. The shift actuator shifts the transmission. The controller controls the shift actuator so as to shift the speed-changing gears of the transmission when the paddle shifter is operated.

The paddle shifter according to a preferred embodiment of the present invention is provided on the supporting frame or the shaft support. Thus, the paddle shifter is prevented from rotating together with the steering wheel when the steering wheel is rotated. This enables a driver to easily operate the paddle shifter so as to shift the gears of the transmission while turning the steering wheel. The paddle shifter and the steering wheel are attached to the body frame via at least the supporting frame. Thus, pivoting of the supporting frame causes the paddle shifter and the steering wheel to move together with respect to the body frame. This does not change the relative position between the paddle shifter and the steering wheel even when the position of the steering wheel is adjusted. Consequently, even after the position of the steering wheel is adjusted, the driver is still allowed to easily operate the paddle shifter so as to shift the gears of the transmission.

According to another preferred embodiment of the present invention, the supporting frame preferably includes at least two connectors connected with the body frame.

This preferred embodiment of the present invention further stabilizes the connection of the supporting frame to the body frame.

According to still another preferred embodiment of the present invention, the supporting frame is preferably U-shaped.

This preferred embodiment of the present invention enhances the rigidity of the supporting frame.

According to yet another preferred embodiment of the present invention, the supporting frame preferably is a single pipe frame.

This preferred embodiment of the present invention reduces the number of components, resulting in weight and cost reductions.

According to still yet another preferred embodiment of the present invention, the vehicle preferably further includes a power steering system disposed on the shaft support. The power steering system preferably includes a steering actuator that assists a driver in turning the steering wheel.

If the power steering system and the shaft support are separate from each other, pivoting of the supporting frame changes the relative position between the power steering system and the steering shaft provided in the shaft support. Thus, in order to counter the change in the relative position, it is necessary to provide a member, such as a universal joint, to enable the power steering system and the steering shaft to move in conjunction with each other. In contrast, the above preferred embodiments enable the power steering system and the shaft support to move together when the supporting frame pivots, thus eliminating the need for the member, such as a universal joint, and simplifying the structure of the power steering system.

According to another preferred embodiment of the present invention, the paddle shifter is preferably disposed rearward relative to the steering actuator, and forward relative to the steering wheel.

This preferred embodiment of the present invention enables the driver to easily operate the paddle shifter, and increases the layout flexibility of the paddle shifter.

According to still another preferred embodiment of the present invention, the vehicle preferably further includes a gear indicator disposed on the supporting frame or the shaft support. The gear indicator preferably indicates a current gear of the transmission.

This preferred embodiment of the present invention enables the gear indicator to move together with the supporting frame when the supporting frame pivots. Thus, the visibility of the gear indicator is ensured.

According to yet another preferred embodiment of the present invention, the paddle shifter preferably includes a left shifter disposed leftward relative to the steering shaft, and a right shifter disposed rightward relative to the steering shaft. The left shifter and the right shifter are preferably separate from each other.

This preferred embodiment of the present invention increases the flexibility of mounting positions of the right and left shifters because the right and left shifters are separate from each other. Furthermore, the paddle shifter is smaller in overall size than when the right and left shifters are integral with each other.

According to still yet another preferred embodiment of the present invention, the left shifter preferably includes a first extension located inward relative to the steering wheel as viewed along an axis of the steering shaft. The right shifter preferably includes a second extension located inward relative to the steering wheel as viewed along the axis of the steering shaft.

This preferred embodiment of the present invention enables the driver to more easily shift the gears of the transmission when marks signifying downshifting and upshifting, for example, are respectively provided on the first and second extensions.

Various preferred embodiments of the present invention provide a steering wheel-equipped vehicle that facilitates shifting of gears of a transmission.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
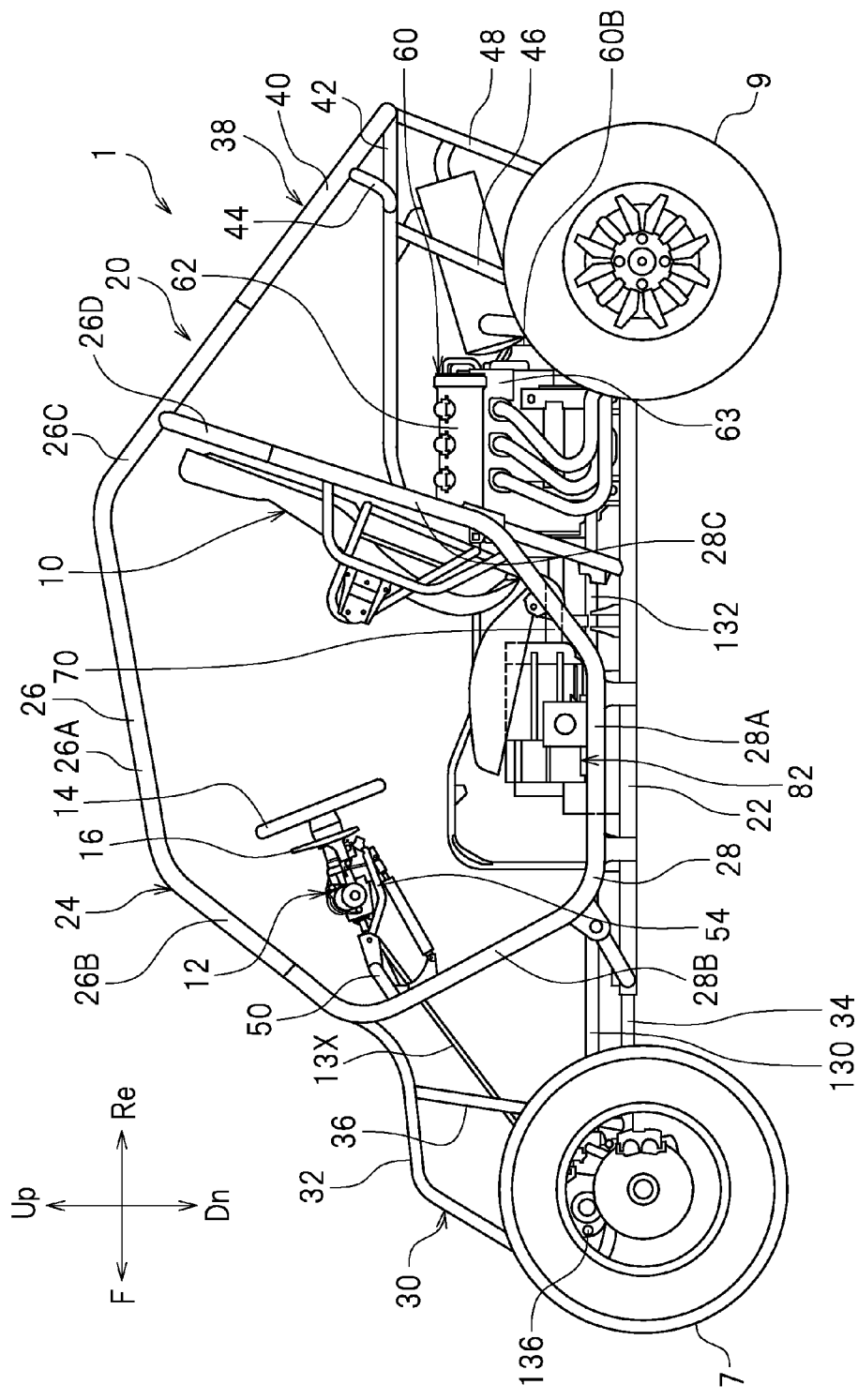
FIG. 1 is a left side view of an ROV according to a preferred embodiment of the present invention.

Hereinafter, preferred embodiments of the present invention will be described. As illustrated in FIG. 1, a vehicle according to the present preferred embodiment is preferably a recreational off-highway vehicle (ROV) 1, for example. The ROV 1 is suitable for traveling over rough terrain. The vehicle according to preferred embodiments of the present invention is not limited to an ROV.

Unless otherwise noted, the terms "front", "rear", "right", "left", "up", and "down" respectively refer to front, rear, right, left, up, and down with respect to a driver sitting on one of the right and left seats 10 of the ROV 1 in the following description. The terms "up" and "down" respectively refer to the vertically upward direction and the vertically downward direction when the ROV 1 is stationary on a horizontal plane. Reference signs "F", "Re", "R", "L", "Up", and "Dn" in the drawings respectively represent front, rear, right, left, up, and down.

As illustrated in FIG. 1, the ROV 1 includes a body frame 20. The body frame 20 is preferably a pipe frame. The body frame 20 preferably includes a main frame 22 extending in the front-rear direction of the vehicle, a center frame 24 disposed higher than the main frame 22, a front frame 30 disposed in front of the center frame 24, and a rear frame 38 disposed behind the center frame 24.

The center frame 24 preferably includes an upper center sub-frame 26 and a lower center sub-frame 28. The upper center sub-frame 26 is disposed above the lower center sub-frame 28. The upper center sub-frame 26 is connected to the lower center sub-frame 28. The upper center sub-frame 26 preferably includes a first portion 26A extending in the front-rear direction or substantially in the front-rear direction of the vehicle, a second portion 26B extending obliquely downward and forward from the front end of the first portion 26A, a third portion 26C extending obliquely downward and rearward from the rear end of the first portion 26A, and a fourth portion 26D extending obliquely downward and forward from a location somewhere along the third portion 26C. The lower center sub-frame 28 is disposed higher than the main frame 22. The lower center sub-frame 28 is connected to the main frame 22. The lower center sub-frame 28 preferably includes a first portion 28A extending in the front-rear direction or substantially in the front-rear direction of the vehicle, a second portion 28B extending obliquely upward and forward from the front end of the first portion 28A, and a third portion 28C extending obliquely upward and rearward from the rear end of the first portion 28A. The first portion 28A of the lower center sub-frame 28 is connected to the main frame 22. The second portion 28B of the lower center sub-frame 28 is connected to the second portion 26B of the upper center sub-frame 26. The third portion 28C of the lower center sub-frame 28 is connected to the fourth portion 26D of the upper center sub-frame 26.

As illustrated in FIG. 1, the front frame 30 preferably includes an upper front sub-frame 32, a lower front sub-frame 34, and a front down sub-frame 36. The upper front sub-frame 32 is connected to the second portion 28B of the lower center sub-frame 28. The front down sub-frame 36 extends downward from a location somewhere along the upper front sub-frame 32. The front down sub-frame 36 is connected to a location somewhere along the lower front sub-frame 34. The lower front sub-frame 34 extends in the front-rear direction of the vehicle. The front end of the lower front sub-frame 34 is connected to the upper front sub-frame 32. The rear end of the lower front sub-frame 34 is connected to the main frame 22.

As illustrated in FIG. 1, the rear frame 38 preferably includes an upper rear sub-frame 40, a lower rear sub-frame 42, a first rear down sub-frame 44, a second rear down sub-frame 46, and a third rear down sub-frame 48. The upper rear sub-frame 40 extends obliquely downward and rearward from the third portion 26C of the upper center sub-frame 26. The lower rear sub-frame 42 extends rearward from a location somewhere along the third portion 28C of the lower center sub-frame 28. The rear end of the upper rear sub-frame 40 and the rear end of the lower rear sub-frame 42 are connected to each other. The first rear down sub-frame 44 extends obliquely downward and forward from a location somewhere along the upper rear sub-frame 40. The first rear down sub-frame 44 is connected to a location somewhere along the lower rear sub-frame 42. The second rear down sub-frame 46 extends obliquely downward and forward from a location somewhere along the lower rear sub-frame 42. The second rear down sub-frame 46 is connected to the main frame 22. The second rear down sub-frame 46 is disposed forward relative to the first rear down sub-frame 44. The third rear down sub-frame 48 extends obliquely downward and forward from the rear end of the lower rear sub-frame 42. The third rear down sub-frame 48 is disposed rearward relative to the second rear down sub-frame 46. The third rear down sub-frame 48 is connected to the main frame 22.

As illustrated in FIG. 1, the ROV 1 preferably includes right and left seats 10. The right and left seats 10 are supported by the body frame 20. More specifically, the right and left seats 10 are supported by the main frame 22. Alternatively, the number of the seats 10 may be three or more. The seats 10 may be arranged side-by-side in the width direction of the vehicle.

As illustrated in FIG. 1, the ROV 1 preferably further includes right and left front wheels 7, and right and left rear wheels 9. The right and left front wheels 7 are attached to an axle (not illustrated) provided on the front frame 30. The right and left rear wheels 9 are attached to an axle (not illustrated) provided on the rear frame 38.

As illustrated in FIG. 1, the ROV 1 further includes an engine 60. The engine 60 is supported by the body frame 20. More specifically, the engine 60 is supported by the main frame 22. The engine 60 is disposed lower than the lower rear sub-frame 42. The engine 60 is disposed rearward relative to the right and left seats 10. The engine 60 preferably includes a rear end 60B located rearward relative to the right and left seats 10.

Figure 2:
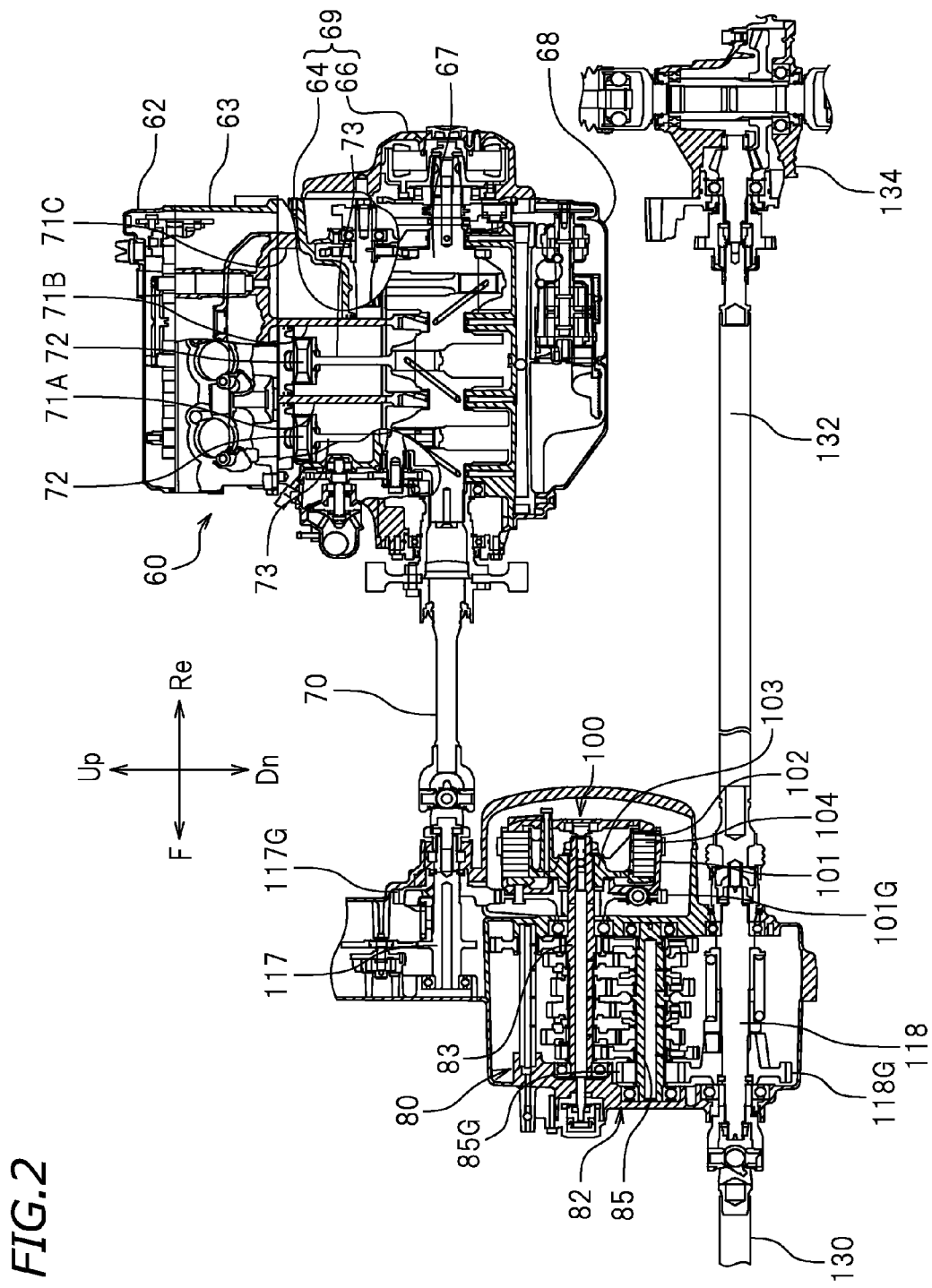
FIG. 2 is a cross-sectional view of an engine, a transmission, and adjacent components according to a preferred embodiment of the present invention.

As illustrated in FIG. 2, the engine 60 preferably further includes a crankcase 66, a cylinder body 64, a cylinder head 63, and a cylinder head cover 62. Disposed under the crankcase 66 is an oil pan 68. The oil pan 68 collects oil that has flowed through the engine 60. The cylinder body 64 extends upward from the crankcase 66. The cylinder head 63 is disposed on the cylinder body 64 and joined to the upper portion of the cylinder body 64. The cylinder head cover 62 is disposed on the cylinder head 63 and joined to the upper portion of the cylinder head 63.

As illustrated in FIG. 2, the engine 60 preferably further includes a crankshaft 67 extending in the front-rear direction of the vehicle. The crankcase 66 and the cylinder body 64 define a crankcase unit 69. In other words, the crankcase unit 69 conceptually includes the crankcase 66 and the cylinder body 64, for example. The crankshaft 67 is disposed inside the crankcase unit 69. The crankcase unit 69 supports the periphery of the crankshaft 67. In the present preferred embodiment, the crankshaft 67 is supported at the mating surface between the crankcase 66 and the cylinder body 64. The front end portion of the crankshaft 67 is connected with a connecting shaft 70. The connecting shaft 70 is connected to an input shaft 117 (which will be described below).

As illustrated in FIG. 2, a first cylinder 71A, a second cylinder 71B, and a third cylinder 71C are provided inside the cylinder body 64. The first, second, and third cylinders 71A, 71B, and 71C extend upward from a lateral portion of the crankcase 66. The first, second, and third cylinders 71A, 71B, and 71C are preferably aligned in the front-rear direction of the vehicle, for example. The second cylinder 71B is disposed behind the first cylinder 71A. The third cylinder 71C is disposed behind the second cylinder 71B. The engine 60 is preferably a three cylinder engine, for example. The first, second, and third cylinders 71A, 71B, and 71C each contain a piston 72. Each piston 72 is connected to the crankshaft 67 via a connecting rod 73. Although the engine 60 according to the present preferred embodiment preferably is a three cylinder engine equipped with the first, second, and third cylinders 71A, 71B, and 71C, the engine 60 may be a single cylinder engine, or may be a multi-cylinder engine equipped with two cylinders or four or more cylinders.

As illustrated in FIG. 1, the ROV 1 further includes a transmission 80 (see FIG. 2), and a transmission case 82 housing the transmission 80. The transmission case 82 is a component separate from the engine 60. The transmission case 82 is spaced apart from the engine 60. The transmission case 82 is disposed forward relative to the engine 60. The transmission case 82 is supported by the main frame 22.

As illustrated in FIG. 2, the transmission 80 preferably includes the input shaft 117, a clutch 100, a main shaft 83, a drive shaft 85, and an output shaft 118.

As illustrated in FIG. 2, the input shaft 117 extends in the front-rear direction of the vehicle. The input shaft 117 is housed in the transmission case 82. The input shaft 117 is disposed coaxially with the crankshaft 67. The input shaft 117 is connected to the connecting shaft 70. The input shaft 117 rotates by receiving a driving force from the crankshaft 67. The input shaft 117 is provided with a gear 117G.

Figure 3:
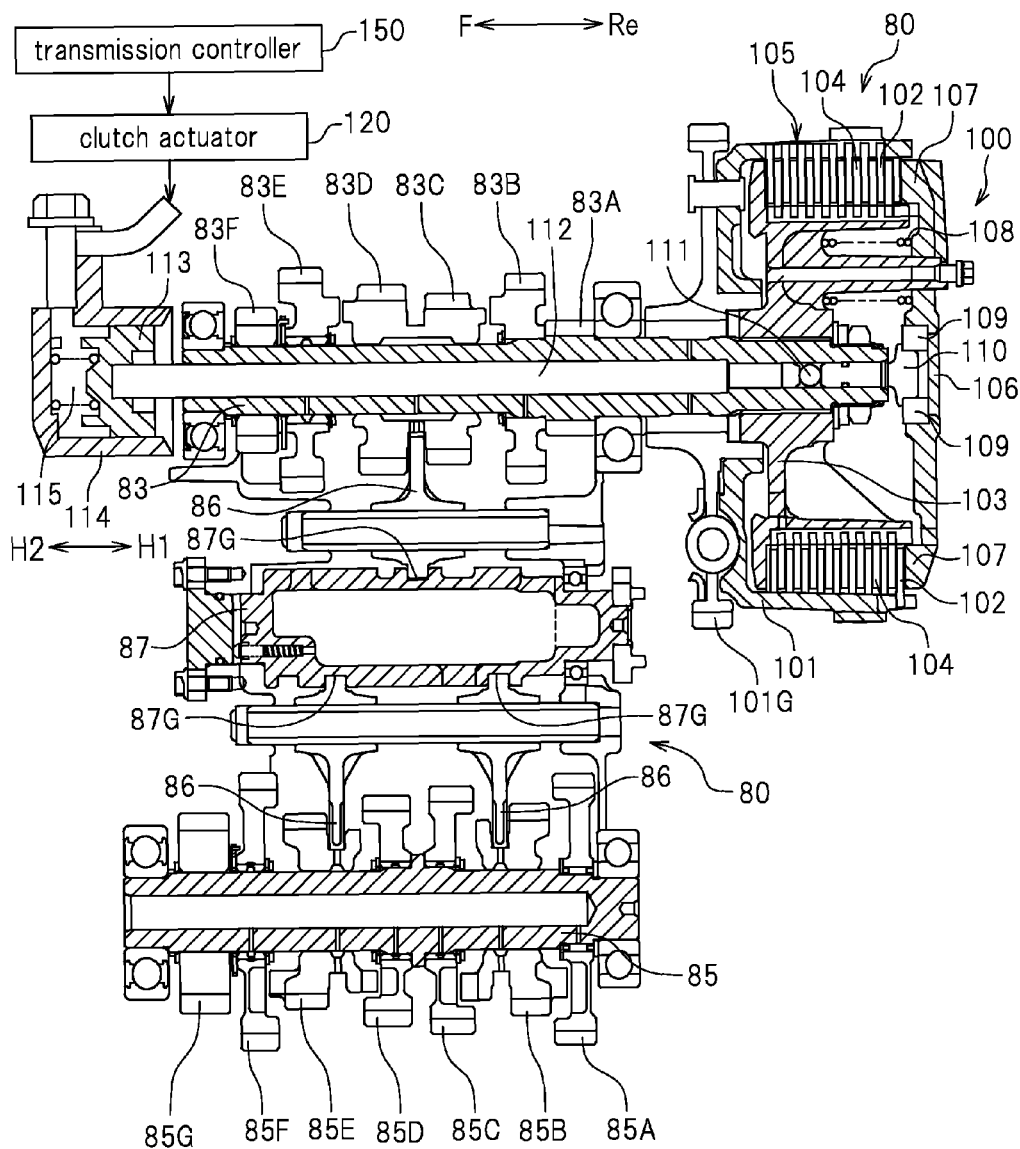
FIG. 3 is a cross-sectional view of the transmission according to a preferred embodiment of the present invention.

As illustrated in FIG. 2, the clutch 100 is preferably a wet multi-plate friction clutch. A torque produced by the crankshaft 67 is transmitted to the clutch 100 via the input shaft 117. The clutch 100 transmits or cuts off the torque produced by the crankshaft 67. The clutch 100 is disposed inside the transmission case 82. The clutch 100 is provided on the rear end portion of the main shaft 83. As illustrated in FIG. 3, the clutch 100 preferably includes a clutch housing 101, a clutch boss 103, a plurality of driving plates 102, and a plurality of driven plates 104. The driving plates 102 are provided inward of the clutch housing 101. The driving plates 102 rotate together with the clutch housing 101. The torque of the crankshaft 67 (see FIG. 2) is transmitted to the driving plates 102. The driven plates 104 are arranged outward of the clutch boss 103. The driven plates 104 rotate together with the clutch boss 103. The driving plates 102 and the driven plates 104 are arranged alternately in the front-rear direction of the vehicle. The clutch housing 101 is provided with a gear 101G. As illustrated in FIG. 2, the gear 101G intermeshes with the gear 117G of the input shaft 117. Thus, the clutch housing 101 is connected to the input shaft 117. In the present preferred embodiment, the plurality of driving plates 102 and the plurality of driven plates 104 define a plate group 105. Alternatively, the clutch 100 may be a single-plate friction clutch. The clutch 100 may be a dry friction clutch.

As illustrated in FIG. 3, a pressure plate 106 is disposed behind the main shaft 83. The pressure plate 106 preferably has a substantially disk-shaped configuration. The pressure plate 106 is provided at its radially outward portion with a presser 107 protruding toward the plate group 105. The presser 107 faces the rearmost driving plate 102 of the plate group 105.

The clutch 100 is provided with a spring 108. The spring 108 urges the pressure plate 106 forward. More specifically, the spring 108 urges the pressure plate 106 in the direction in which the presser 107 presses the plate group 105.

The central portion of the pressure plate 106 is engaged with a first end portion of a push rod 110 via a bearing 109. Thus, the pressure plate 106 is rotatable with respect to the push rod 110. The main shaft 83 is tubular. A second end portion of the push rod 110 is contained inside the main shaft 83. The main shaft 83 is internally provided with a spherical ball 111 adjacent to the second end portion of the push rod 110. The main shaft 83 is further internally provided with a push rod 112 adjacent to the ball 111.

The left end portion of the push rod 112 protrudes outward from the main shaft 83. The left end portion of the push rod 112 is integral with a piston 113. The piston 113 is slidable along the axis of the main shaft 83 and guided through a cylinder 114.

As illustrated in FIG. 3, the ROV 1 preferably further includes a clutch actuator 120. The clutch 100 is engaged and disengaged by the clutch actuator 120. Although the clutch actuator 120 is an electric motor in the present preferred embodiment, the clutch actuator 120 is not limited to an electric motor. The clutch actuator 120 is driven to cause the driving plates 102 and the driven plates 104 to come into contact with each other, thus engaging the clutch 100, or is driven to cause the driving plates 102 and the driven plates 104 to move away from each other, thus disengaging the clutch 100.

When the clutch actuator 120 is driven to disengage the clutch 100, a hydraulic fluid is supplied to a space 115 surrounded by the piston 113 and the cylinder 114. The hydraulic fluid supplied to the space 115 presses and moves the piston 113 in the direction indicated by the arrow H1 in FIG. 3. Thus, the piston 113 pushes the pressure plate 106 in the direction of the arrow H1 in FIG. 3 via the push rod 112, the ball 111, the push rod 110, and the bearing 109. The presser 107 of the pressure plate 106 pushed in the direction of the arrow H1 in FIG. 3 moves away from the rearmost driving plate 102. This disengages the clutch 100. With the presser 107 moved away from the plate group 105, the driving plates 102 and the driven plates 104 are spaced apart from each other. Consequently, no frictional force, which transmits a torque, is generated between the driving plates 102 and the driven plates 104.

When the clutch actuator 120 is driven to engage the clutch 100, the spring 108 causes the pressure plate 106 to move in the direction indicated by the arrow H2 in FIG. 3. Upon movement of the pressure plate 106 in the direction of the arrow H2 in FIG. 3, the presser 107 presses the plate group 105 in the direction of the arrow H2 in FIG. 3. This engages the clutch 100. With the plate group 105 pressed in the direction of the arrow H2 in FIG. 3 by the presser 107, the driving plates 102 and the driven plates 104 are in contact with each other. Consequently, a frictional force, which transmits a torque, is generated between the driving plates 102 and the driven plates 104. In other words, the driving plates 102 and the driven plates 104 rotate together.

As illustrated in FIG. 3, the main shaft 83 extends in the front-rear direction of the vehicle. The main shaft 83 is housed in the transmission case 82 (see FIG. 2). The main shaft 83 is parallel or substantially parallel to the input shaft 117 (see FIG. 2). The main shaft 83 is fixed to the clutch boss 103. The main shaft 83 rotates together with the clutch boss 103. The main shaft 83 rotates by receiving a driving force from the crankshaft 67. As illustrated in FIG. 3, the main shaft 83 is provided with main shaft gears 83A to 83F. The main shaft gears 83A, 83B, 83E, and 83F are fixed gears that are immovable along the axis of the main shaft 83. The main shaft gears 83C and 83D are movable gears that are movable along the axis of the main shaft 83. The main shaft gears 83A to 83F rotate together with the main shaft 83. The main shaft gears 83B and 83E rotate with respect to the main shaft 83 depending on intermeshing states thereof.

As illustrated in FIG. 3, the drive shaft 85 extends in the front-rear direction of the vehicle. The drive shaft 85 is housed in the transmission case 82 (see FIG. 2). The drive shaft 85 is parallel or substantially parallel to the main shaft 83. The drive shaft 85 is provided with drive shaft gears 85A to 85F. The drive shaft gears 85A to 85F respectively intermesh with the main shaft gears 83A to 83F. The drive shaft gears 85A, 85C, 85D, and 85F are fixed gears that are immovable along the axis of the drive shaft 85. The drive shaft gears 85B and 85E are movable gears that are movable along the axis of the drive shaft 85. The drive shaft gears 85A to 85F rotate together with the drive shaft 85. The drive shaft gears 85A, 85C, 85D, and 85F rotate with respect to the drive shaft 85 depending on intermeshing states thereof. The front end portion of the drive shaft 85 is provided with a gear 85G.

As illustrated in FIG. 2, the output shaft 118 extends in the front-rear direction of the vehicle. The output shaft 118 is housed in the transmission case 82. The output shaft 118 is provided with a gear 118G. The gear 118G intermeshes with the gear 85G of the drive shaft 85. Thus, the output shaft 118 is connected to the drive shaft 85. The output shaft 118 rotates by receiving a driving force from the drive shaft 85. The front end portion of the output shaft 118 is connected with a front propeller shaft 130. The front propeller shaft 130 extends in the front-rear direction of the vehicle. The front propeller shaft 130 rotates by receiving a driving force from the output shaft 118. The front propeller shaft 130 is connected to the right and left front wheels 7 (see FIG. 1) via a front differential 136 (see FIG. 1). The rear end portion of the output shaft 118 is connected with a rear propeller shaft 132. The rear propeller shaft 132 extends in the front-rear direction of the vehicle. The rear propeller shaft 132 rotates by receiving a driving force from the output shaft 118. The rear propeller shaft 132 is connected to the right and left rear wheels 9 (see FIG. 1) via a final gear 134. The ROV 1 according to the present preferred embodiment is a four-wheel drive vehicle, but is not limited to such a vehicle.

As illustrated in FIG. 3, the transmission 80 preferably further includes a shift drum 87 and a shift fork 86. The shift drum 87 is provided with a plurality of grooves 87G. The axial position of each groove 87G changes in accordance with an angle of rotation of the shift drum 87. Each groove 87G is engaged with the shift fork 86. The shift fork 86 is engaged with the main shaft gears 83C and 83D and the drive shaft gears 85B and 85E. Upon rotation of the shift drum 87, the shift fork 86 moves along the axis of the shift drum 87. The shift fork 86 in turn moves at least one of the main shaft gears 83C and 83D and the drive shaft gears 85B and 85E. This changes a combination of the intermeshing gears selected from the main shaft gears 83A to 83F and the drive shaft gears 85A to 85F, thus changing a transmission gear ratio.

Figure 4:
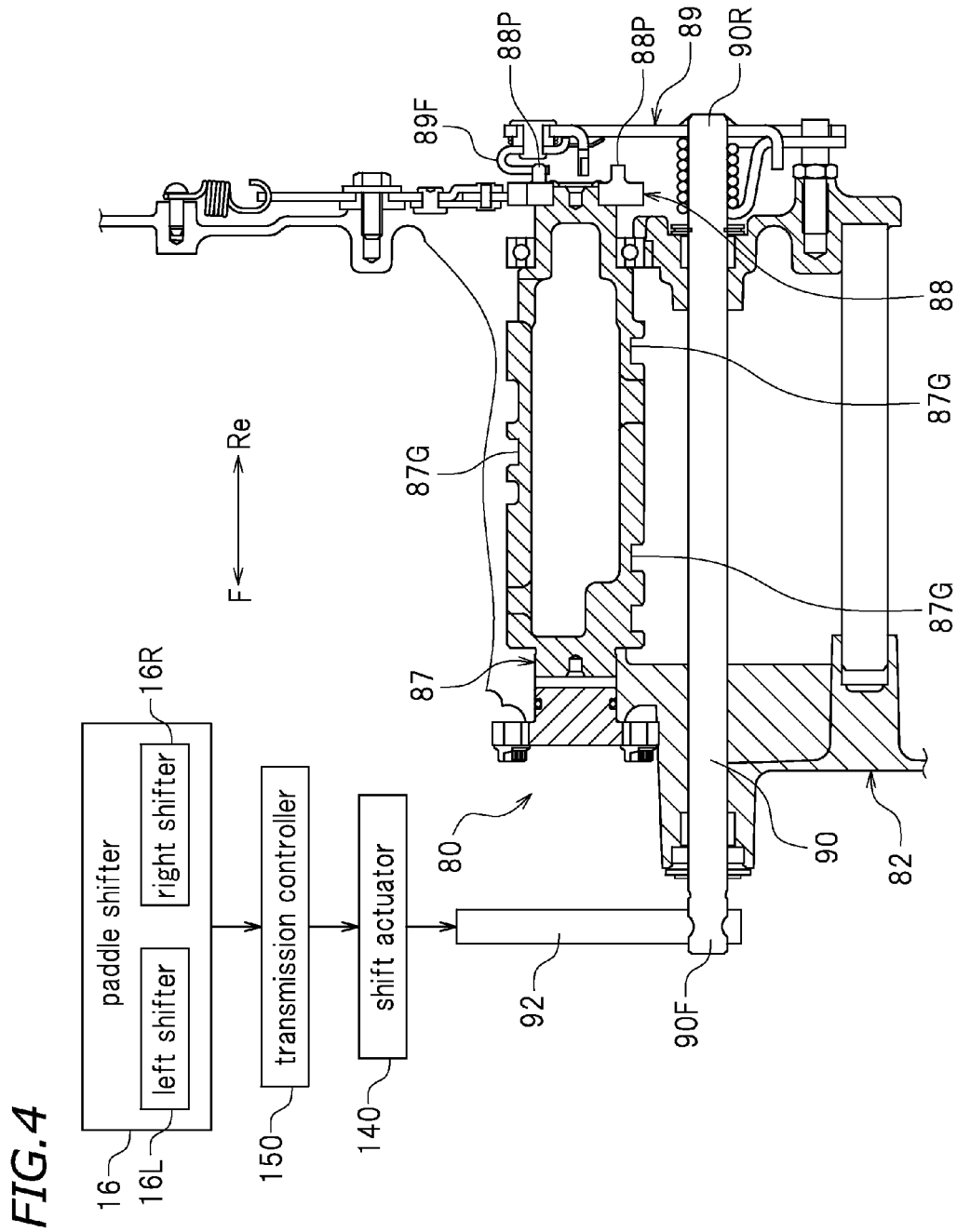
FIG. 4 is a cross-sectional view of a shift drum and adjacent components according to a preferred embodiment of the present invention.

As illustrated in FIG. 4, the transmission 80 preferably further includes a shift shaft 90. The shift shaft 90 extends in the front-rear direction of the vehicle. The shift shaft 90 is rotatable. The shift shaft 90 is supported by the transmission case 82. The shift shaft 90 preferably includes a rear end portion 90R fixed to a shift lever 89 (which will be described below). The shift shaft 90 preferably further includes a front end portion 90F located outward of the transmission case 82. The front end portion 90F of the shift shaft 90 is connected to a link 92.

As illustrated in FIG. 4, the transmission 80 preferably includes a rotational plate 88 and the shift lever 89. The rotational plate 88 preferably includes a plurality of pins 88P. The rotational plate 88 is fixed to the rear end of the shift drum 87. The rotational plate 88 rotates together with the shift drum 87. The shift lever 89 engages with the rotational plate 88. The shift lever 89 is provided with a hook 89F that engages with the pin(s) 88P of the rotational plate 88.

As illustrated in FIG. 4, the ROV 1 preferably further includes a shift actuator 140. The shift actuator 140 shifts the transmission 80. The shift actuator 140 causes the shift drum 87 to rotate. Although the shift actuator 140 is an electric motor in the present preferred embodiment, the shift actuator 140 is not limited to an electric motor. Upon being driven, the shift actuator 140 rotates the shift shaft 90 via the link 92 causing the shift lever 89 to rotate. The rotation of the shift lever 89 results in the engagement of the hook 89F of the shift lever 89 with the pin(s) 88P of the rotational plate 88, thus rotating the rotational plate 88 and the shift drum 87. Upon rotation of the shift drum 87 by a predetermined angle, pair (s) of the intermeshing gears, selected from the main shaft gears 83A to 83F and the drive shaft gears 85A to 85F, is/are disengaged, and replaced by other pair(s) of the intermeshing gears.

The ROV 1 preferably further includes a transmission controller 150 (see FIG. 4) that controls the clutch actuator 120 and the shift actuator 140. When a paddle shifter 16 (which will be described below) is operated, the transmission controller 150 controls the shift actuator 140 so as to change the combination of the intermeshing gears of the transmission 80, selected from the main shaft gears 83A to 83F and the drive shaft gears 85A to 85F.

Figure 5:
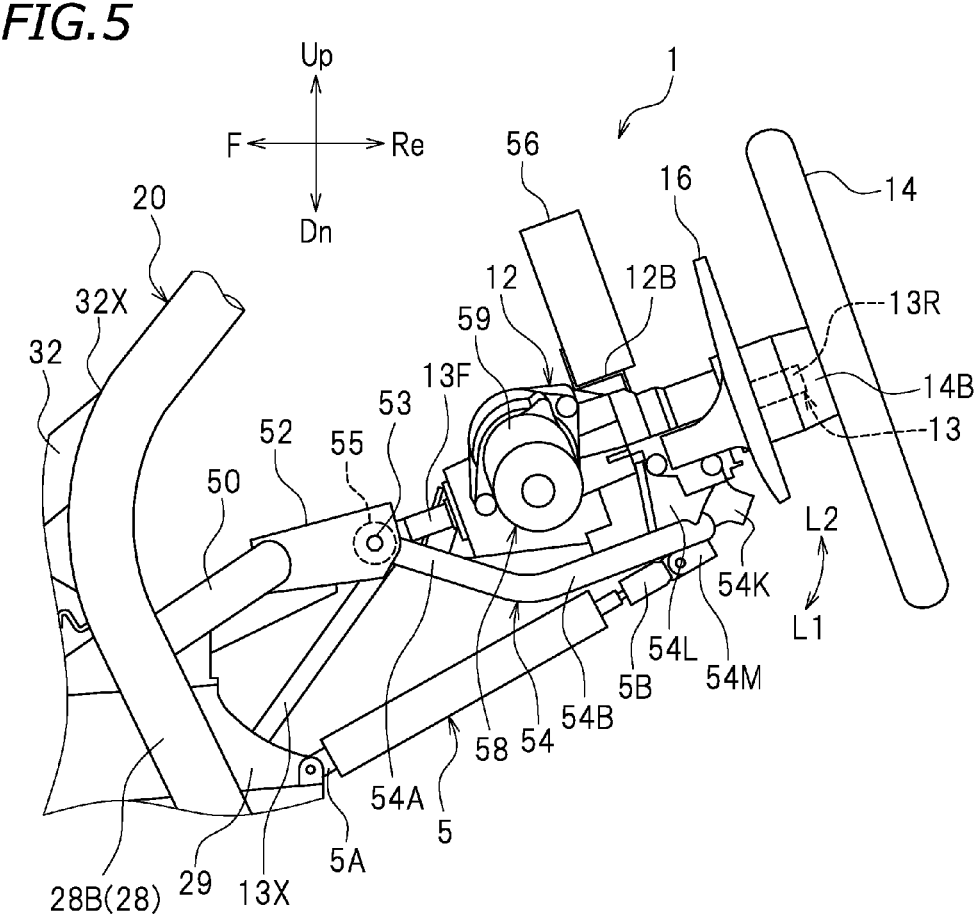
FIG. 5 is a left side view of a steering wheel and adjacent components according to a preferred embodiment of the present invention.
Figure 6:
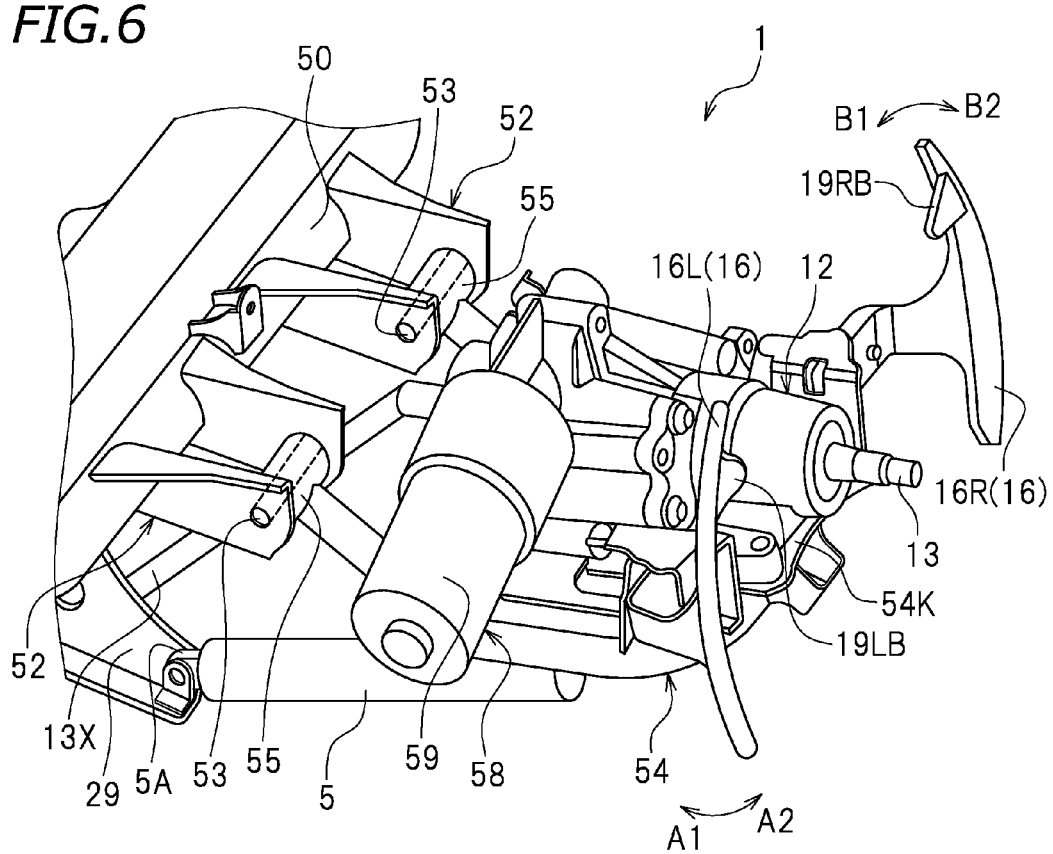
FIG. 6 is a perspective view of components adjacent to the steering wheel according to a preferred embodiment of the present invention.

As illustrated in FIG. 5, the ROV 1 preferably further includes a cross member 50 extending in the width direction of the vehicle, and a supporting frame 54 connected to the cross member 50. The cross member 50 is provided on the second portion 28B of the lower center sub-frame 28. Note that the cross member 50 is included in the body frame 20. The cross member 50 is disposed lower than a connection 32X between the lower center sub-frame 28 and the upper front sub-frame 32. As illustrated in FIG. 6, the cross member 50 is provided with a pair of right and left brackets 52. Note that in FIG. 6, a steering wheel 14 and a gear indicator 56 (which will be described below) are not illustrated for the sake of convenience.

As illustrated in FIG. 6, the supporting frame 54 is preferably U-shaped or substantially U-shaped. The supporting frame 54 is preferably a single pipe frame. The supporting frame 54 preferably includes two connectors 55 connected with the cross member 50. One of the connectors 55 is provided on one end of the supporting frame 54, and the other connector 55 is provided on the other end of the supporting frame 54. As illustrated in FIG. 5, the supporting frame 54 preferably includes first portions 54A extending obliquely downward and rearward from the connectors 55, and a second portion 54B extending obliquely upward and rearward from the first portions 54A. The supporting frame 54 is pivotally connected to the cross member 50 via pivot shafts 53. The connectors 55 and the brackets 52 are connected to each other via the pivot shafts 53. Note that the shape of the supporting frame 54 is not limited to a U shape or substantially a U shape. The supporting frame 54 may include a plurality of pipe frames. The supporting frame 54 may include three or more connectors 55 connected to the cross member 50.

Figure 7:
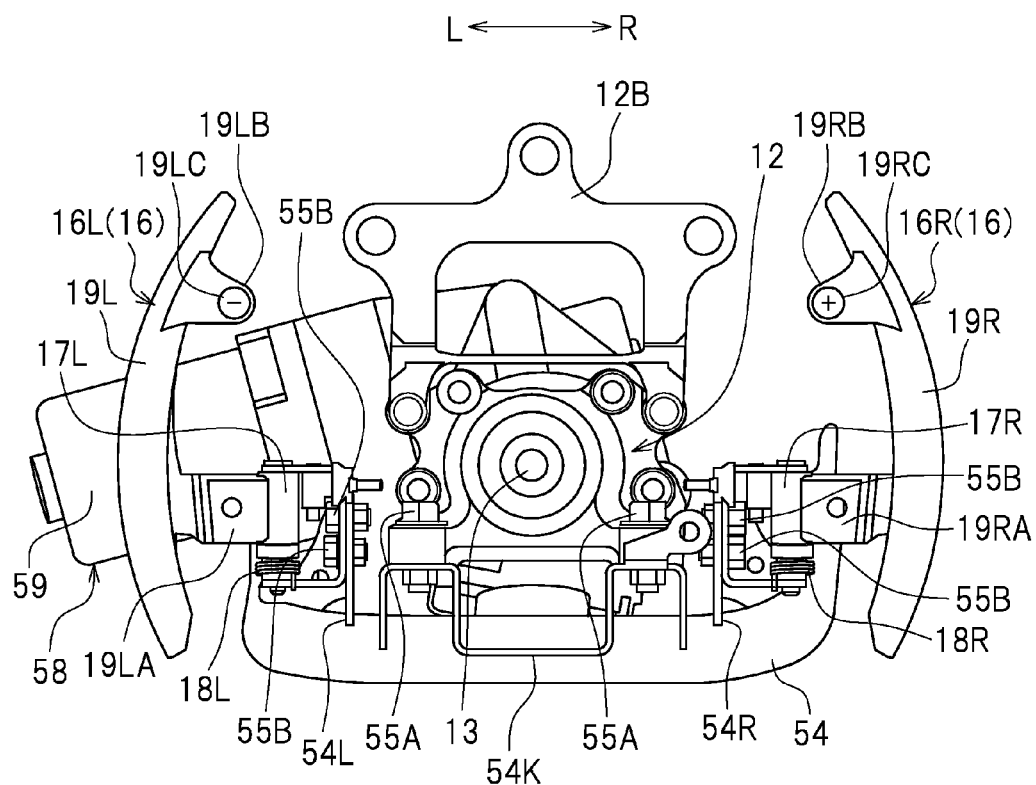
FIG. 7 is a diagram illustrating a paddle shifter according to a preferred embodiment of the present invention, as viewed along the axis of a steering shaft.

As illustrated in FIG. 5, the ROV 1 preferably includes a shaft support 12, the steering wheel 14, and the paddle shifter 16. The shaft support 12 is fixed to the supporting frame 54. More specifically, the shaft support 12 is fixed to a bracket 54K (see also FIG. 6) provided on the supporting frame 54. As illustrated in FIG. 7, the shaft support 12 is fixed to the bracket 54K with bolts 55A. As illustrated in FIG. 5, the shaft support 12 preferably includes a steering shaft 13 (see also FIG. 6). The steering shaft 13 is rotatable with respect to the shaft support 12. The steering shaft 13 preferably includes a front end portion 13F disposed forward relative to the shaft support 12. The steering shaft 13 preferably further includes a rear end portion 13R disposed rearward relative to the shaft support 12. The front end portion 13F of the steering shaft 13 is connected with an intermediate shaft 13X. The right and left front wheels 7 are controlled with the steering wheel 14 via the intermediate shaft 13X. Note that in FIG. 7, the steering wheel 14 is not illustrated for the sake of convenience.

Figure 8:
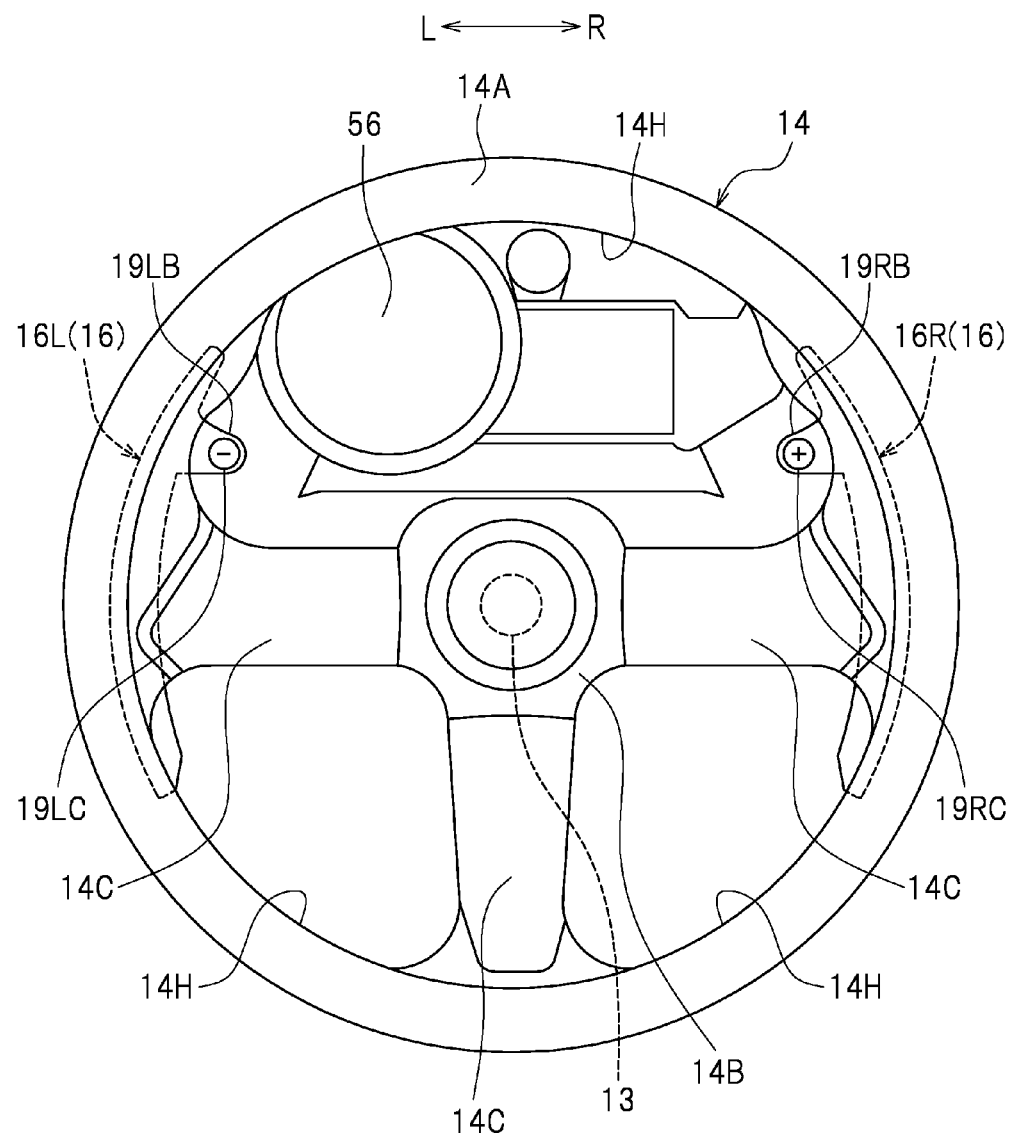
FIG. 8 is a diagram illustrating the steering wheel according to a preferred embodiment of the present invention, as viewed along the axis of the steering shaft.

As illustrated in FIG. 5, the steering wheel 14 is connected to the steering shaft 13. More specifically, the steering wheel 14 is connected to the rear end portion 13R of the steering shaft 13. The steering wheel 14 is rotatable around the steering shaft 13 with respect to the shaft support 12. As illustrated in FIG. 8, the steering wheel 14 preferably includes an annular rim 14A, a boss 14B disposed inward of the rim 14A, and a spoke unit 14C connecting the rim 14A and the boss 14B to each other. The boss 14B is connected to the steering shaft 13. The steering wheel 14 is provided with openings 14H. Each opening 14H is surrounded by the rim 14A, the boss 14B, and the spoke unit 14C. Note that in FIG. 8, the shaft support 12 and the supporting frame 54 are not illustrated for the sake of convenience.

As illustrated in FIG. 5, the paddle shifter 16 is provided on the supporting frame 54. More specifically, the paddle shifter 16 is fixed to a bracket 54L and a bracket 54R (see FIG. 7) which are provided on the supporting frame 54. Alternatively, the paddle shifter 16 may be provided on the shaft support 12. The paddle shifter 16 is operable to move toward the steering shaft 13. The paddle shifter 16 is disposed forward relative to the steering wheel 14. The paddle shifter 16 is disposed rearward relative to a power steering system 58 (which will be described below). As illustrated in FIG. 7, the paddle shifter 16 preferably includes a left shifter 16L and a right shifter 16R. The right and left shifters 16R and 16L are preferably separate from each other. The right and left shifters 16R and 16L are preferably spaced apart from each other. The left shifter 16L is disposed leftward relative to the steering shaft 13. The right shifter 16R is disposed rightward relative to the steering shaft 13.

Figure 9:
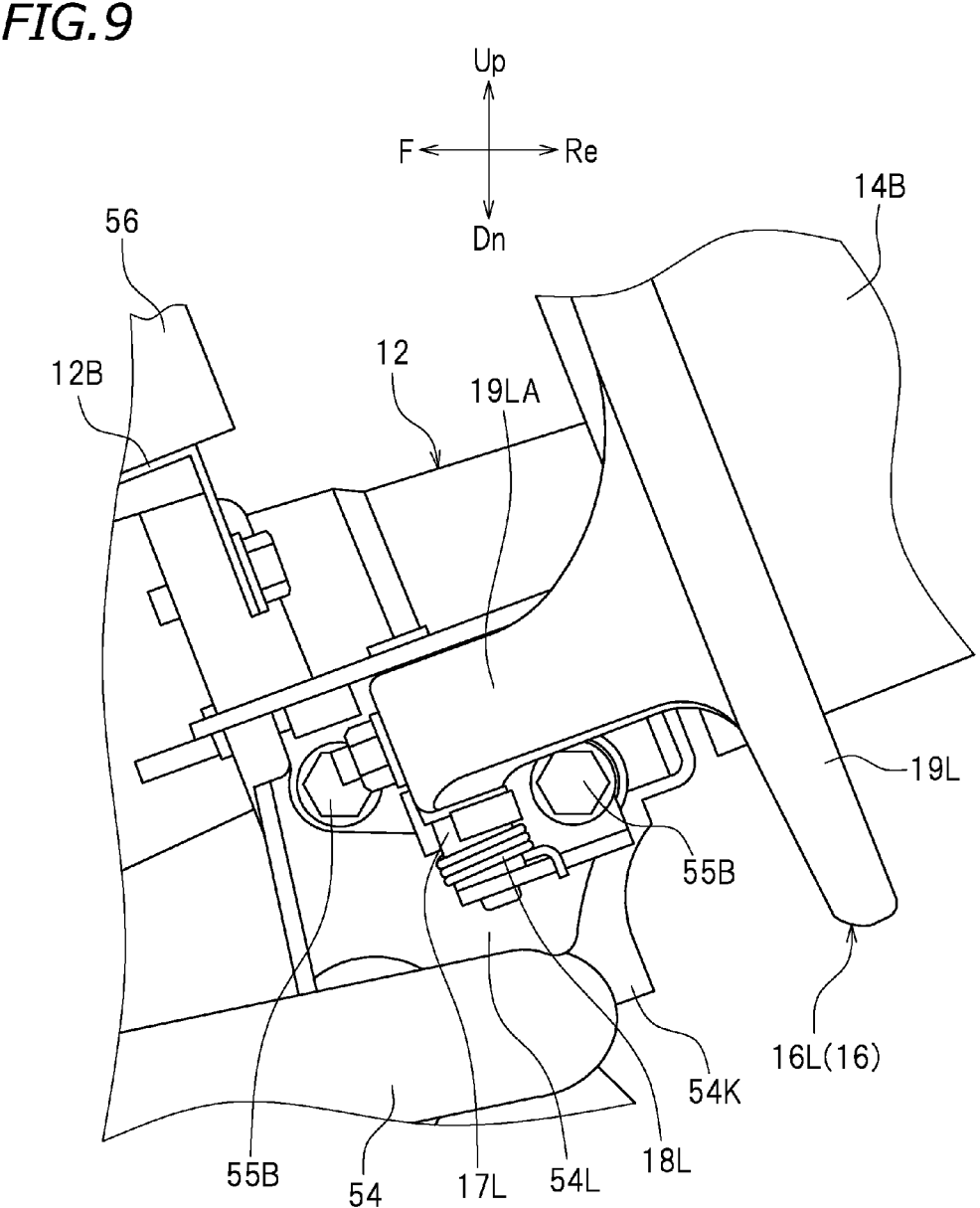
FIG. 9 is a partially enlarged view of FIG. 5.
Figure 10:
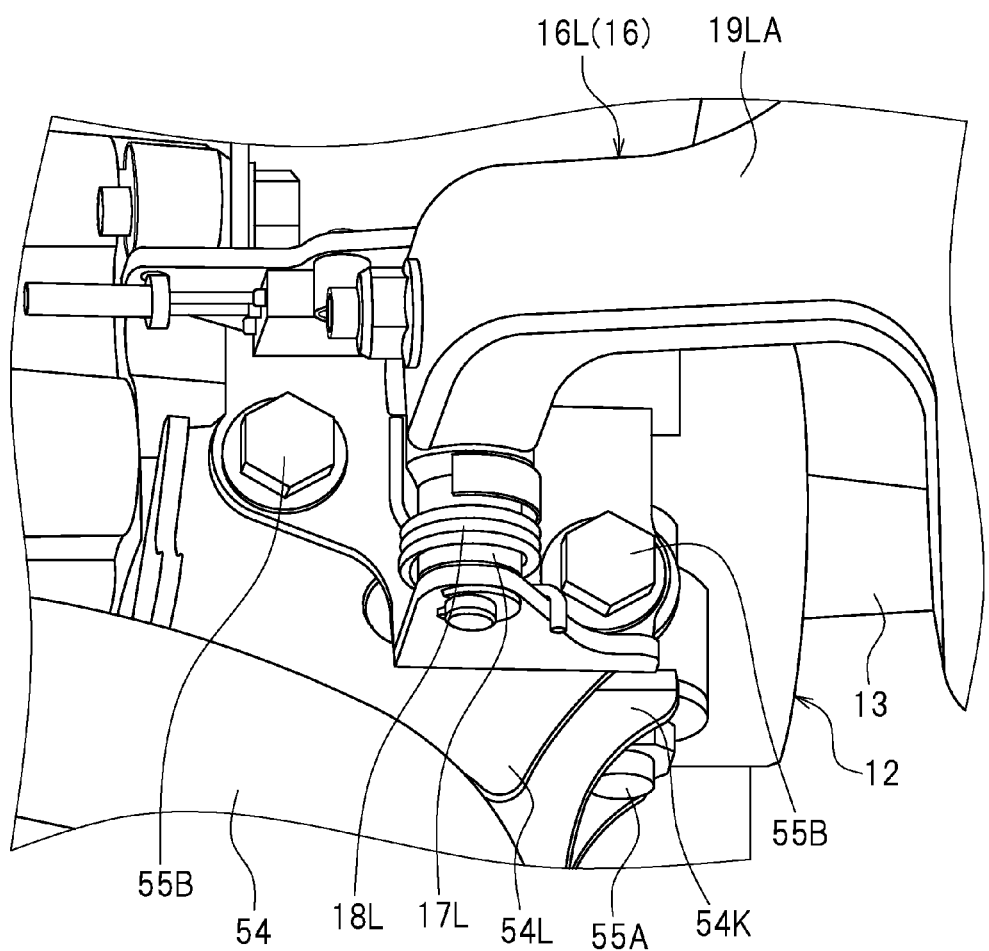
FIG. 10 is an enlarged perspective view of components adjacent to the steering wheel according to a preferred embodiment of the present invention.

As illustrated in FIG. 9, the left shifter 16L is provided on the supporting frame 54. More specifically, the left shifter 16L is fixed to the bracket 54L provided on the supporting frame 54. As illustrated in FIG. 10, the left shifter 16L and the bracket 54L are fixed to each other with bolts 55B. The left shifter 16L is operable to move toward the steering shaft 13. As illustrated in FIG. 7, the left shifter 16L preferably includes a left body 19L extending in the up-down direction or substantially in the up-down direction of the vehicle, a left rotation shaft 17L, and a left connection 19LA connecting the left body 19L and the left rotation shaft 17L to each other. The left body 19L is preferably arc-shaped. The left rotation shaft 17L extends in the up-down direction of the vehicle. The left rotation shaft 17L is provided with a left spring 18L. The left spring 18L urges the left shifter 16L in the direction indicated by the arrow A1 in FIG. 6. In other words, the left spring 18L urges the left shifter 16L toward the front of the vehicle. The left body 19L rotates around the left rotation shaft 17L in the direction indicated by the arrow A2 in FIG. 6. In other words, the left body 19L rotates around the left rotation shaft 17L toward the rear of the vehicle. This means that the left body 19L rotates around the left rotation shaft 17L toward the steering wheel 14. Alternatively, the left shifter 16L may slide in the front-rear direction of the vehicle.

As illustrated in FIG. 7, the right shifter 16R is provided on the supporting frame 54. More specifically, the right shifter 16R is fixed to the bracket 54R provided on the supporting frame 54. The right shifter 16R and the bracket 54R are preferably fixed to each other with bolts 55B, for example. The right shifter 16R is operable to move toward the steering shaft 13. The right shifter 16R preferably includes a right body 19R extending in the up-down direction or substantially in the up-down direction of the vehicle, a right rotation shaft 17R, and a right connection 19RA connecting the right body 19R and the right rotation shaft 17R to each other. The right body 19R is preferably arc-shaped. The right rotation shaft 17R extends in the up-down direction of the vehicle. The right rotation shaft 17R is provided with a right spring 18R. The right spring 18R urges the right shifter 16R in the direction indicated by the arrow B1 in FIG. 6. In other words, the right spring 18R urges the right shifter 16R toward the front of the vehicle. The right body 19R rotates around the right rotation shaft 17R in the direction indicated by the arrow B2 in FIG. 6. In other words, the right body 19R rotates around the right rotation shaft 17R toward the rear of the vehicle. This means that the right body 19R rotates around the right rotation shaft 17R toward the steering wheel 14. Alternatively, the right shifter 16R may slide in the front-rear direction of the vehicle.

As illustrated in FIG. 7, the left shifter 16L preferably further includes a first extension 19LB. The first extension 19LB is provided on an upper portion of the left body 19L. The first extension 19LB extends rightward from the left body 19L. The first extension 19LB is provided with a first indicator 19LC marked with "−". The first indicator 19LC indicates that the left shifter 16L is used for downshifting. The right shifter 16R preferably further includes a second extension 19RB. The second extension 19RB is provided on an upper portion of the right body 19R. The second extension 19RB extends leftward from the right body 19R. The second extension 19RB is provided with a second indicator 19RC marked with "+". The second indicator 19RC indicates that the right shifter 16R is used for upshifting. As illustrated in FIG. 8, the first extension 19LB is located inward relative to the steering wheel 14 as viewed along the axis of the steering shaft 13. More specifically, the first extension 19LB is located inward relative to the rim 14A as viewed along the axis of the steering shaft 13. The second extension 19RB is located inward relative to the steering wheel 14 as viewed along the axis of the steering shaft 13. More specifically, the second extension 19RB is located inward relative to the rim 14A as viewed along the axis of the steering shaft 13. When the steering wheel 14 is at a neutral position, i.e., when neither of the right and left front wheels 7 is inclined, neither the first extension 19LB nor the second extension 19RB overlaps with the steering wheel 14 as viewed along the axis of the steering shaft 13. In this case, the first and second extensions 19LB and 19RB overlap with the opening 14H of the steering wheel 14.

The driver manually operates the paddle shifter 16 so as to upshift or downshift the gear of the transmission 80 (which is provided by a combination of the intermeshing gears selected from the main shaft gears 83A to 83F and the drive shaft gears 85A to 85F) between a first gear and a top gear (e.g., a sixth gear in the present preferred embodiment). Note that the term "gear of the transmission" refers to a particular position of the gears in the vehicle that gives a particular range of speed. The paddle shifter 16 outputs a speed change command to the transmission controller 150 (see FIG. 4). In accordance with the speed change command, the transmission controller 150 changes the gear of the transmission 80. More specifically, when the driver operates the right shifter 16R to cause the right shifter 16R to move in the direction of the arrow B2 in FIG. 6, a speed change command for upshifting the gear of the transmission 80 is output from the right shifter 16R to the transmission controller 150. In accordance with the speed change command, the transmission controller 150 controls the shift actuator 140 to rotate the shift drum 87 of the transmission 80, thus changing the combination of the intermeshing gears selected from the main shaft gears 83A to 83F and the drive shaft gears 85A to 85F so as to upshift the gear of the transmission 80 to the next higher gear. Upon release of the right shifter 16R by the driver, the urging force of the right spring 18R moves the right shifter 16R in the direction of the arrow B1 in FIG. 6, so that the right shifter 16R returns to its pre-operation state. When the driver operates the left shifter 16L to cause the left shifter 16L to move in the direction of the arrow A2 in FIG. 6, a speed change command for downshifting the gear of the transmission 80 is output from the left shifter 16L to the transmission controller 150. In accordance with the speed change command, the transmission controller 150 controls the shift actuator 140 to rotate the shift drum 87 of the transmission 80, thus changing the combination of the intermeshing gears selected from the main shaft gears 83A to 83F and the drive shaft gears 85A to 85F so as to downshift the gear of the transmission 80 to the next lower gear. Upon release of the left shifter 16L by the driver, the urging force of the left spring 18L moves the left shifter 16L in the direction of the arrow A1 in FIG. 6, so that the left shifter 16L returns to its pre-operation state. Alternatively, the gear of the transmission 80 may be downshifted when the right shifter 16R is operated, and may be upshifted when the left shifter 16L is operated. The transmission 80 of the ROV 1 may be selectively shifted between forward, neutral, and reverse using a switch (not illustrated).

As illustrated in FIG. 5, the ROV 1 preferably further includes a damper 5. The damper 5 is disposed lower than the shaft support 12. The damper 5 preferably includes a front end 5A connected to a bracket 29 provided on the lower center sub-frame 28. The bracket 29 is provided lower than the cross member 50. The damper 5 preferably further includes a rear end 5B connected to a bracket 54M provided on the supporting frame 54. The bracket 54M is provided lower than the bracket 54L and the bracket 54R (see FIG. 7). Adjusting the axial length of the damper 5 causes the supporting frame 54 to pivot around the pivot shafts 53 in the directions indicated by the arrows L1 and L2 in FIG. 5. In other words, the supporting frame 54 pivots upward and downward around the pivot shafts 53. Thus, the steering wheel 14, connected to the steering shaft 13 of the shaft support 12, is adjusted in position in the up-down direction of the vehicle.

As illustrated in FIG. 6, the ROV 1 preferably includes the power steering system 58. The power steering system 58 is provided on the shaft support 12. The power steering system 58 preferably includes a steering actuator 59 that assists the driver in turning the steering wheel 14. As illustrated in FIG. 7, the steering actuator 59 is disposed leftward relative to the steering shaft 13.

As illustrated in FIG. 5, the ROV 1 preferably includes the gear indicator 56. The gear indicator 56 indicates the current gear of the transmission 80. The gear indicator 56 is provided on the shaft support 12. More specifically, the gear indicator 56 is provided on a bracket 12B (see also FIG. 7) of the shaft support 12. Alternatively, the gear indicator 56 may be provided on the supporting frame 54. The gear indicator 56 is disposed rearward relative to the steering actuator 59. As illustrated in FIG. 8, the gear indicator 56 is disposed inward of the steering wheel 14 when viewed along the axis of the steering shaft 13.

As illustrated in FIG. 5, the paddle shifter 16 of the ROV 1 is provided on the supporting frame 54 as previously described. Thus, the paddle shifter 16 is prevented from rotating together with the steering wheel 14 when the steering wheel 14 is rotated. This enables the driver to easily operate the paddle shifter 16 so as to shift the gears of the transmission 80 while turning the steering wheel 14. The paddle shifter 16 and the steering wheel 14 are attached to the body frame 20 via at least the supporting frame 54. Thus, pivoting of the supporting frame 54 causes the paddle shifter 16 and the steering wheel 14 to move together with respect to the body frame 20. This does not change the relative position between the paddle shifter 16 and the steering wheel 14 even when the position of the steering wheel 14 is adjusted. Consequently, even after the position of the steering wheel 14 is adjusted, the driver is still allowed to easily operate the paddle shifter 16 so as to shift the gears of the transmission 80.

As illustrated in FIG. 6, the supporting frame 54 of the ROV 1 according to a preferred embodiment preferably includes the two connectors 55 connected with the cross member 50. This further stabilizes the connection of the supporting frame 54 to the cross member 50.

The supporting frame 54 of the ROV 1 according to a preferred embodiment is preferably U-shaped or substantially U-shaped. This enhances the rigidity of the supporting frame 54.

The supporting frame 54 of the ROV 1 according to a preferred embodiment is preferably a single pipe frame. This reduces the number of components, resulting in weight and cost reductions.

As illustrated in FIG. 5, the ROV 1 according to a preferred embodiment preferably includes the power steering system 58 that is provided on the shaft support 12 and includes the steering actuator 59. This enables the steering actuator 59 to move together with the shaft support 12 when the supporting frame 54 pivots.

As illustrated in FIG. 5, the paddle shifter 16 of the ROV 1 according to a preferred embodiment is provided rearward relative to the steering actuator 59, and forward relative to the steering wheel 14. This enables the driver to easily operate the paddle shifter 16, and increases the layout flexibility of the paddle shifter 16.

As illustrated in FIG. 5, the ROV 1 according to a preferred embodiment preferably includes the gear indicator 56 provided on the shaft support 12. This enables the gear indicator 56 to move together with the supporting frame 54 when the supporting frame 54 pivots. Thus, the visibility of the gear indicator 56 is ensured.

As illustrated in FIG. 7, the right and left shifters 16R and 16L of the ROV 1 according to a preferred embodiment are separate from each other. This increases the flexibility of the mounting positions of the right and left shifters 16R and 16L. Furthermore, the paddle shifter 16 is smaller in overall size than when the right and left shifters 16R and 16L are integral with each other.

As illustrated in FIG. 7, the first and second extensions 19LB and 19RB of the ROV 1 according to a preferred embodiment of the present invention are respectively provided with the first indicator 19LC for downshifting and the second indicator 19RC for upshifting. This enables the driver to shift the gears of the transmission 80 more easily.

The terms and expressions that have been employed are used as terms of description and not of limitation, and there is no intention, in the use of such terms and expressions, of excluding any equivalents of the features shown and described or portions thereof, but it is recognized that various modifications are possible within the scope of the claims. While the present invention may be embodied in many different forms, a number of preferred embodiments are described herein with the understanding that the present disclosure is to be considered as providing examples of the principles of the present invention and that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   at least one pivot shaft;
   a supporting frame pivotally connected to the body frame via the at least one pivot shaft;
   a shaft support fixed to the supporting frame, the shaft support including a steering shaft;
   a steering wheel connected to the steering shaft, the steering wheel being rotatable around the steering shaft with respect to the shaft support;
   a paddle shifter disposed on the supporting frame or the shaft support, the paddle shifter being operable to move toward the steering shaft;
   a transmission supported by the body frame, the transmission including a plurality of speed-changing gears;
   a shift actuator that shifts the transmission;
   a controller that controls the shift actuator so as to shift the speed-changing gears of the transmission when the paddle shifter is operated; and
   a power steering system disposed on the shaft support, the power steering system including a steering actuator that assists a driver in turning the steering wheel; wherein the paddle shifter includes:

a left shifter disposed leftward relative to the steering shaft and connected to the supporting frame or the shaft support by a left shifter connector; and a right shifter disposed rightward relative to the steering shaft and connected to the supporting frame or the shaft support by a right shifter connector;

the left shifter and the right shifter are separate and spaced apart from each other;

the left shifter includes, as viewed along an axis of the steering shaft, a first main body overlapping the steering wheel, and a first extension protruding radially inward from the first main body and located radially inward relative to the steering wheel;

the right shifter includes, as viewed along an axis of the steering shaft, a second main body overlapping the steering wheel, and a second extension protruding radially inward from the second main body and located radially inward relative to the steering wheel; and the paddle shifter is disposed rearward relative to the steering actuator, and forward relative to the steering wheel.

2. The vehicle according to claim 1, wherein the supporting frame includes at least two supporting frame connectors connected with the body frame.

3. The vehicle according to claim 2, wherein the supporting frame is U-shaped or substantially U-shaped.

4. The vehicle according to claim 3, wherein the supporting frame is a single pipe frame.

5. The vehicle according to claim 1, further comprising a gear indicator disposed on the supporting frame or the shaft support, the gear indicator indicating a current gear of the transmission.

6. A vehicle comprising:
a body frame;
at least one pivot shaft;
a supporting frame pivotally connected to the body frame via the at least one pivot shaft;
a shaft support fixed to the supporting frame, the shaft support including a steering shaft;
a steering wheel connected to the steering shaft, the steering wheel being rotatable around the steering shaft with respect to the shaft support;
a paddle shifter disposed on the supporting frame or the shaft support, the paddle shifter being operable to move toward the steering shaft;
a transmission supported by the body frame, the transmission including a plurality of speed-changing gears;
a shift actuator that shifts the transmission; and
a controller that controls the shift actuator so as to shift the speed-changing gears of the transmission when the paddle shifter is operated; wherein
the supporting frame is U-shaped or substantially U-shaped, and is a single pipe frame.

7. The vehicle according to claim 6, wherein the supporting frame includes at least two connectors connected with the body frame.

8. The vehicle according to claim 6, further comprising a power steering system disposed on the shaft support, the power steering system including a steering actuator that assists a driver in turning the steering wheel.

9. The vehicle according to claim 8, wherein the paddle shifter is disposed rearward relative to the steering actuator, and forward relative to the steering wheel.

10. The vehicle according to claim 6, further comprising a gear indicator disposed on the supporting frame or the shaft support, the gear indicator indicating a current gear of the transmission.

11. The vehicle according to claim 6, wherein
the paddle shifter includes:
a left shifter disposed leftward relative to the steering shaft; and
a right shifter disposed rightward relative to the steering shaft; and
the left shifter and the right shifter are separate and spaced apart from each other.

12. The vehicle according to claim 11, wherein
the left shifter includes a first extension located inward relative to the steering wheel as viewed along an axis of the steering shaft; and
the right shifter includes a second extension located inward relative to the steering wheel as viewed along the axis of the steering shaft.

13. A vehicle comprising:
a body frame;
at least one pivot shaft;
a supporting frame pivotally connected to the body frame via the pivot shaft;
a shaft support fixed to the supporting frame, the shaft support including a steering shaft;
a steering wheel connected to the steering shaft, the steering wheel being rotatable around the steering shaft with respect to the shaft support;
a paddle shifter disposed on the supporting frame or the shaft support, the paddle shifter being operable to move toward the steering shaft;
a transmission supported by the body frame, the transmission including a plurality of speed-changing gears;
a shift actuator configured to drive the transmission;
a controller configured or programmed to control the shift actuator so as to shift the speed-changing gears of the transmission when the paddle shifter is operated; and
a power steering system disposed on the shaft support, the power steering system including a steering actuator that assists a driver in turning the steering wheel; wherein
the paddle shifter is connected to the supporting frame or the shaft support by a shifter connector; and
the paddle shifter and the shifter connector are disposed rearward relative to the steering actuator, and forward relative to the steering wheel.

* * * * *